United States Patent [19]
Maggi

[11] Patent Number: 5,822,832
[45] Date of Patent: Oct. 20, 1998

[54] HINGE FOR DOORS

[75] Inventor: Rinaldo Maggi, Calolziocorte, Italy

[73] Assignee: Maggi S.p.A., Calolziocorte, Italy

[21] Appl. No.: 820,081

[22] Filed: Mar. 19, 1997

[30] Foreign Application Priority Data

Mar. 19, 1996 [IT] Italy .................................. MI960199 U

[51] Int. Cl.⁶ .................................................. E05D 11/04
[52] U.S. Cl. ................................................. 16/276; 16/243
[58] Field of Search .............................. 16/276, 275, 273, 16/328, 241, 243, 244, 245, 248

[56] References Cited

U.S. PATENT DOCUMENTS

| | | | |
|---|---|---|---|
| 586,146 | 7/1897 | Steinfeldt | 16/276 |
| 822,570 | 6/1906 | Bommer | 16/276 |
| 1,341,690 | 6/1920 | Werner | 16/244 |
| 1,639,633 | 8/1927 | Raymond | 16/276 |
| 2,636,211 | 4/1953 | Williams | 16/275 |
| 3,118,171 | 1/1964 | Parsons | 16/276 |
| 3,465,380 | 9/1969 | Foltz | 16/276 |
| 4,097,959 | 7/1978 | Johnson | 16/276 |
| 4,381,580 | 5/1983 | Hellstrom et al. | 16/243 |

FOREIGN PATENT DOCUMENTS

| | | | |
|---|---|---|---|
| 293050 | 11/1988 | European Pat. Off. . | |
| 525615 | 5/1931 | Germany | 16/276 |
| 582 037 | 7/1933 | Germany . | |
| 1 233 301 | 1/1967 | Germany . | |
| 24 12 725 | 9/1975 | Germany . | |
| 59509 | 9/1925 | Sweden | 16/243 |
| 15077 | 7/1905 | United Kingdom | 16/243 |
| 6775 | 8/1909 | United Kingdom | 16/276 |
| 211865 | 7/1924 | United Kingdom | 16/276 |
| 476700 | 12/1937 | United Kingdom | 16/241 |
| 1 451 739 | 10/1976 | United Kingdom . | |

*Primary Examiner*—Chuck Mah
*Attorney, Agent, or Firm*—Oblon, Spivak, McClelland, Maier & Neustadt, P.C.

[57] ABSTRACT

A hinge, comprising at least one first element which is fastenable to an upright member and a second element which is fastenable to a plurality of rolling bodies interposed between the first element and second element, the rolling bodies rolling along a first annular track and a second annular track respectively provided on the first element and the second element, each of said tracks having a bottom portion and two side portions, wherein the side portions are extended for retaining the rolling bodies inside the tracks during rolling of the rolling bodies along the annular tracks and form between the first element and the second element, in the region of the rolling bodies, an annular gap which is wide enough to prevent contact between the first element and the second element, said annular gap also being formed in an area located coinciding with the axes of symmetry of said first and second elements and wherein adjacent ends of the first and second elements are spaced apart by the annular gap so as to not contact one another.

19 Claims, 11 Drawing Sheets

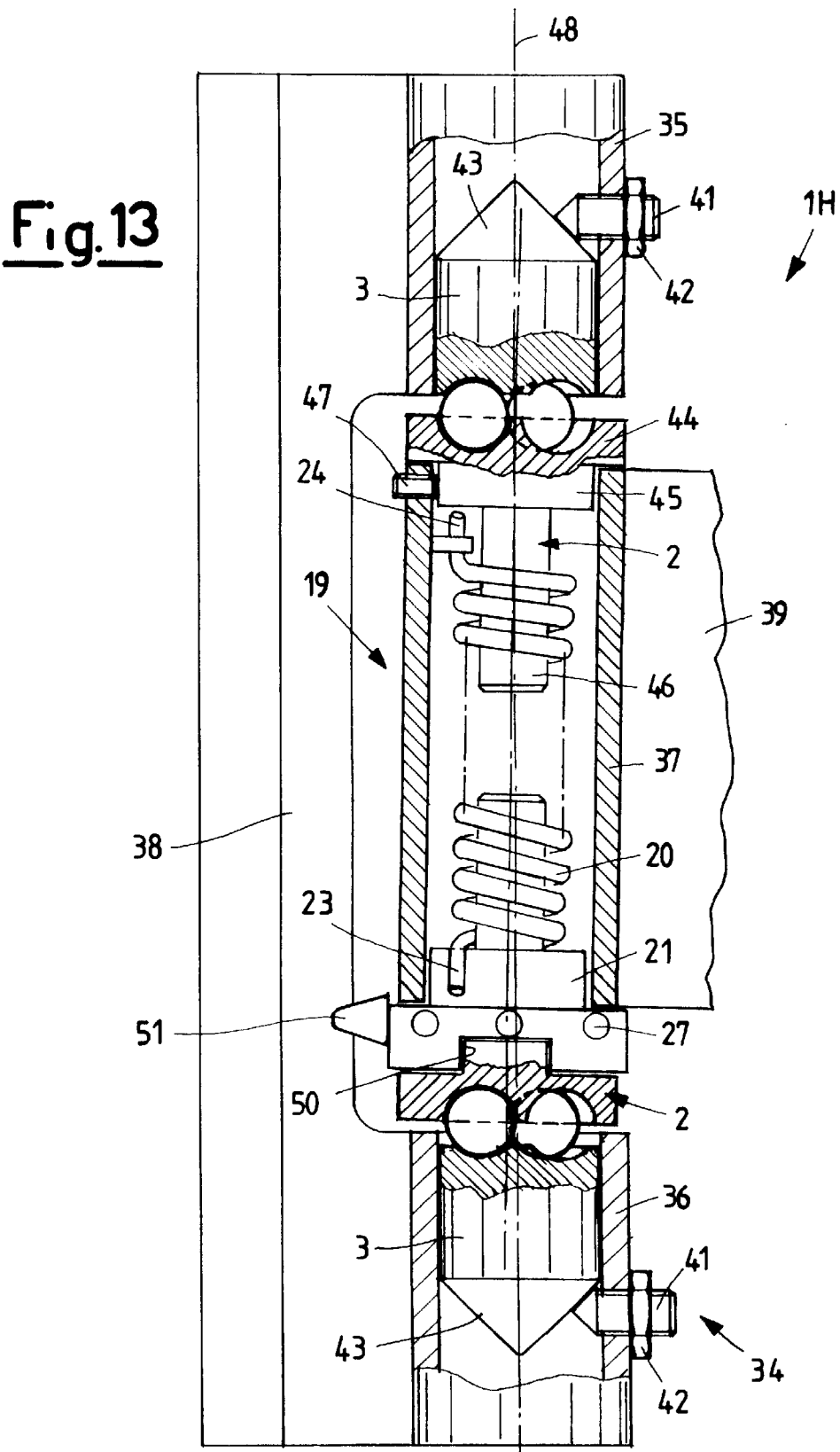

HINGE FOR DOORS

BACKGROUND OF THE INVENTION

1. Field of the Invention

The present invention relates to a hinge for doors.

2. Discussion of the Background

From European patent No. 0 293 050 a hinge for doors is known in which the friction forces between the moving parts have always particularly reduced intensities relatively to the values of the loads the hinge can be submitted to. The control of the friction forces is mainly made possible by the large dimensions of the rolling bodies, as compared to the overall dimensions of the hinge.

However, such use has demonstrated that in those cases in which the external surface of the male portion comes into contact with the inner surface of the female portion (i.e., in those cases in which the symmetry axes of both element in which the sliding tracks for the balls are provided are mutually incident), sliding frictional forces are generated which are harmful to the advantages offered by the hinge. The reasons why the elements mentioned above can take, when the hinge is installed, the mutually incident position, are many and well-known to those skilled in the art, and therefore they will not be mentioned here for the sake of brevity.

In reality, even if the operation of said hinge continues to be substantially satisfactory, it opposes a higher resistance to actuation and creaks.

SUMMARY OF THE INVENTION

The purpose of the present invention is of obviating the above said drawbacks, i.e., of providing a hinge which operates without sliding frictions also in those cases when both elements in which the ball rolling tracks are provided, have mutually incident symmetry axes. In other words, the purpose of the present invention is of providing a hinge which operates always smoothly and, moreover, in all cases, operates noiselessly independently on the mutual positions taken by the elements which constitute it when it is installed.

Such purpose is achieved by a hinge according to claim 1, to which reference is made for the sake of brevity.

The idea on which the invention on the principle grounded is of getting rid of the male-female link which traditionally has always existed in the normal hinges (overcoming a very strong technical prejudice of those operating in this sector) and spacing apart, by means of the same rolling bodies, both elements which bear the relevant sliding tracks, by a long enough distance in order that they cannot come into contact even if they are arranged according to mutually incident axes.

Therefore, by getting rid of the sliding phenomena which took place between the external surface of the male element and the inner surface of the female element when these were arranged in mutually incident positions, any sliding frictional forces are substantially eliminated between the parts of the hinge. Consequently, those frictional forces are eliminated which are most destructive and most burdensome from energy viewpoint which, furthermore, in the absence of lubrication, also generate annoying creaks.

The operating frictional forces acting on the hinge are consequently only the rolling frictional forces which, hence, originate torques for hinge actuation which are reduced enough so that, also in the substantial absence of lubrication, even heavy-weight doors (for example, fireproof or steel-clad doors) can be shut by means of automatic door shutting devices having such small dimensions as to be suitable for being housed inside the same hinge, as shown in the following.

Another advantage consists in that, inasmuch as the first and the second hinge element are (at least in some embodiments) equal, the hinge is also inexpensive. When the hinge is installed, any possible side stresses acting on the first element and on the second element are counteracted by the rolling bodies which hence also perform the function which in the traditional hinges was performed by the male-female link, i.e., by the pivot and its seat inside the female portion.

The above advantages will be evident from the following disclosure based on the hinges illustrated only for exemplifying, non-limitative purposes in the accompanying drawing tables.

FIG. 13 illustrates a hinge of the invention according to a ninth embodiment.

DESCRIPTION OF THE PREFERRED EMBODIMENTS

Figure 1:
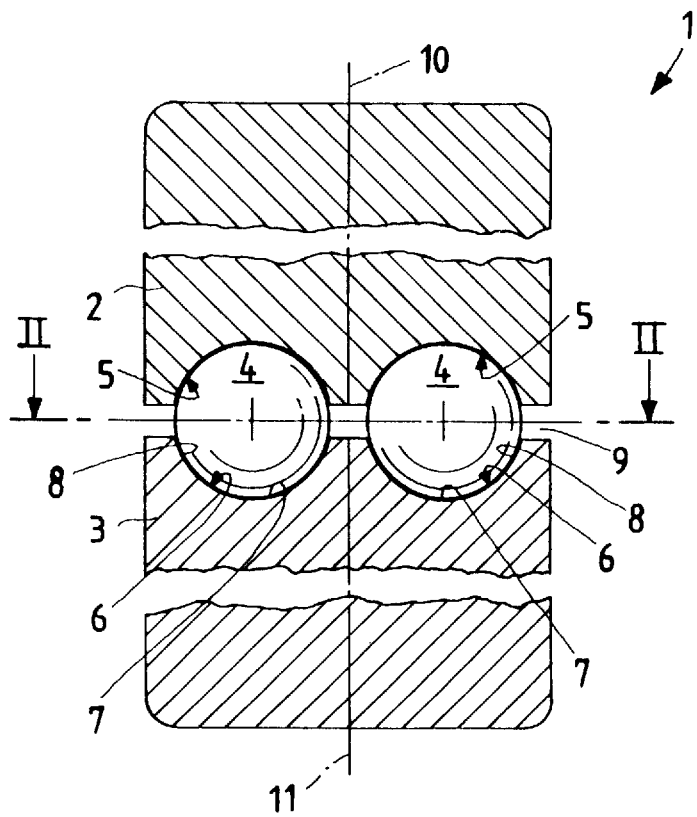
FIG. 1 shows a partial sectional view of a first embodiment of the hinge.
Figure 2:
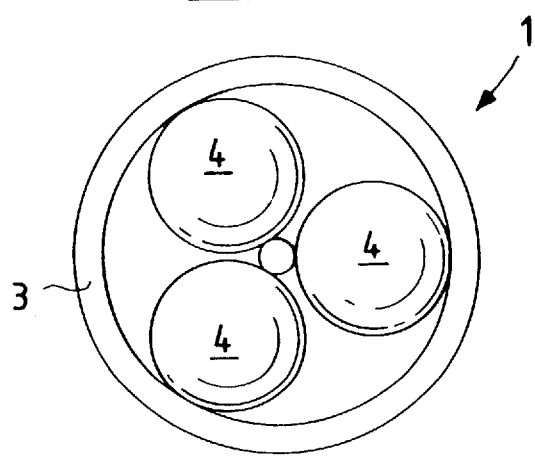
FIG. 2 shows a sectional view according to line II—II of FIG. 1.

Referring to the above mentioned figures and in particular to FIG. 1, the hinge of the invention, generally indicated with reference no. (1), substantially comprises: a first element (2), a second element (3), and rolling bodies (4). The first element (2) and the second element (3) correspondingly bear a first annular track (5) and, respectively, a second annular track (6) along which the rolling bodies (4), which in the herein exemplified case are balls, roll.

The first element (2) can be fastened to the upright, while the second element can be fastened to the door, or vice versa. In the illustrated embodiment (which is the simplest one), the first element (2) and the second element (3) are equal and therefore they can be more easily exchanged in their task and the hinge can be manufactured with lower costs. The first element (2) and the third element (3) are made from a metal material and are not provided with housings or seats for screws, pivots and the like, and can be directly fastened by means of respective weldings. Each of said tracks (5) and (6) has a bottom portion (7) and two side portions (8), the development of which displays the following characteristics:

it is extended enough for retaining the rolling bodies (4) inside the hinge during their rolling along the annular tracks (5, 6);

it is limited enough in order to generate between the first element (2) and the second element (3), in the region of the rolling bodies (4), an annular gap (9) which is wide enough in order to prevent any contacts between the first element (2) and the second element (3) also in the case when the respective symmetry axes (10, 11) do not coincide, and are mutually incident (FIG. 1).

The annular rolling tracks (5) and (6), as well as the rolling bodies (4) have preferably hardened surfaces, by means of case hardening or equivalent treatments.

Figure 3:
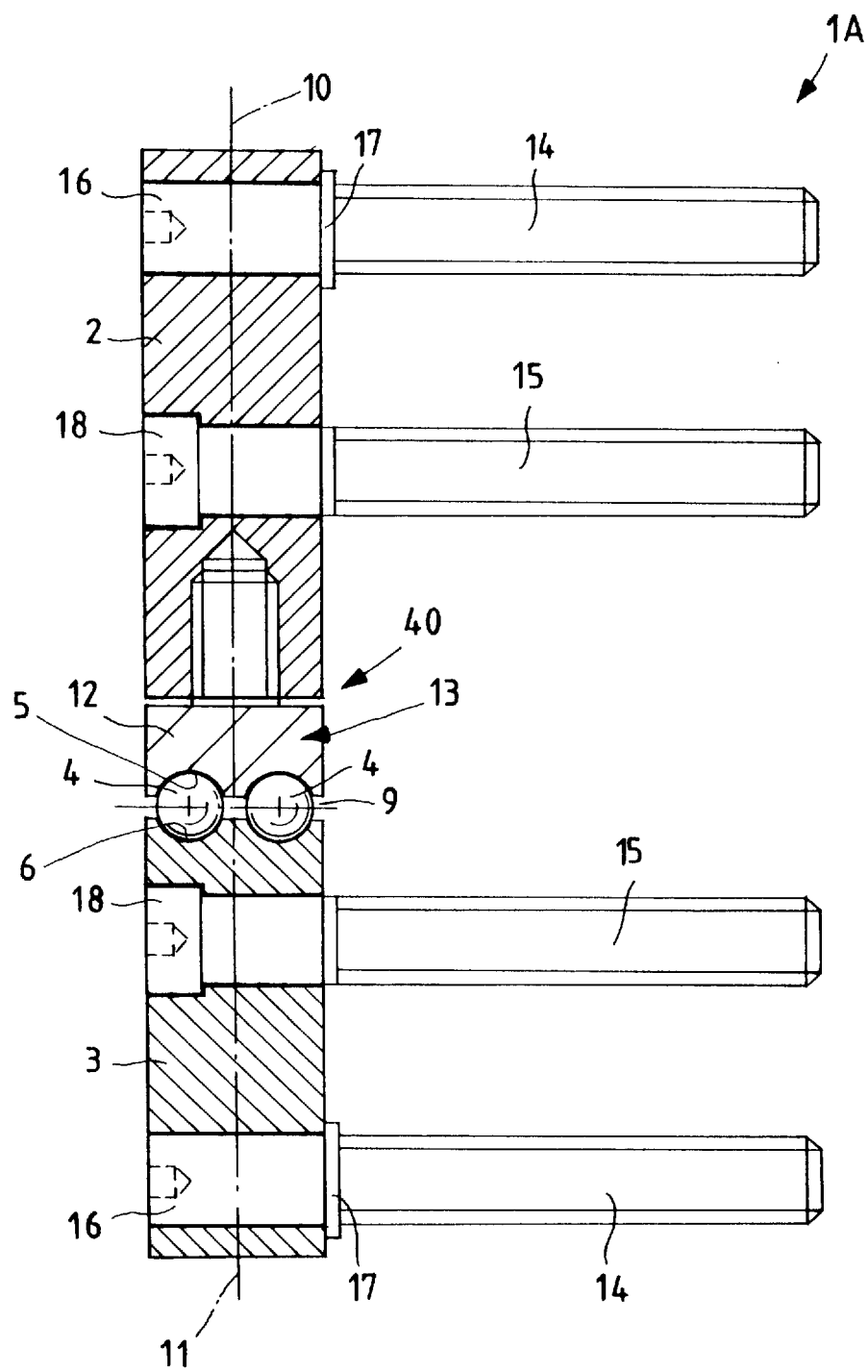
FIG. 3 illustrates a hinge of the present invention according to a second embodiment.

In FIG. 3, the second embodiment of the hinge according to the present invention is generally indicated with (1A), and the corresponding elements of hinge (1) are indicated with the same reference numerals. Hinge (1A) differs from hinge (1) substantially because the vertical position of at least one of both annular tracks (5) and (6) can be varied by means of means for vertical adjustment, generally indicated with (40). In the herein exemplified case, said means (40) comprise one single screw element (13) which can be screwed down into the first element (2) along its symmetry axis (10) and in whose head (12) the first annular track (5) is housed. According to an alternative embodiment, the hinge (1A) could be provided with a one pair of screw elements (13).

The hinge (1A) is suitable for being fastened to doors or gates and to wooden uprights. Due to this reason, each element (2) or (3) is equipped with a first screw (14) and a second screw (15), both of which are provided with threads suitable for penetrating wood and getting engaged inside it. The head (16) of the first screw (14) is uniformly cylindrical, so that the second element (3) can be associated with it after that said first screw (14) has already been screwed down in the planned position for it. A stop element (17) constitutes a first shoulder. By screwing down the second screw (15) slid through the element (2) or (3), said element (2) or (3) gets blocked by the action of the head (18) acting as a second shoulder or stop element. Summarizing, each first element (2) and second element (3) when the hinge (1A) is installed, results to be blocked between a first (18) and a second (17) shoulders or stop elements which are mutually opposite relatively to the symmetry axis (10) or (11); with each stop element being borne by either of the first (14) and second (15) screws. The screws (14) and (15) are through screws running through the element (2) and (3), and consequently can be screwed down or loosened also when elements (2) and (3) have already been installed in their respective operative positions. In this manner way, by screwing down these screws (14) and (15) to a larger or lesser extent, also the horizontal position can be adjusted of the hinge (1A) and consequently of the door relatively to its upright. The first stop element (18) and the second stop element (17) can have cone frustum shapes and can be positioned with their tapers being mutually opposite relatively to the axes (10) and (11) of the first (2) and second (3) hinge elements. The cone frustum-shaped stop elements (17) and (18) are used, for example, in the fourth and fifth embodiments and therefore can be seen, in their installed condition, in FIGS. 6 and 7.

For a better understanding, the reference numerals have been kept unchanged. The cone frustum structure of said stop elements (17) and (18) further facilitate the installation of the hinges which use them, because all of the first screws (14) can be initially installed in such a way that the respective first stop elements (17) are aligned according to an axis parallel to the door revolution axis. The elements (2) and (3) can therefore be applied to said stop elements, so as to automatically be parallel to the door revolution axis and allow further checks and adjustments, as the case may be, still before applying the second screws (15).

The application of the second screws (15) causes the first elements (2) and the second elements (3) to be blocked, without allowing them to change their axial orientation, because they remain blocked between two mutually opposite stop elements and in particular between two mutually opposite tapers of the first (17) and second (18) stop elements. Any subsequent adjustments in position of screws (14) and (15) which may later on become necessary are anyway still possible because said screws are through screws running through the elements (2) and (3), with their respective actuation contours being hence accessible. From the above, it may be deduced how much simple and fast is correctly applying said hinges to the assembly.

It is important to underline here that the hinge (1A) makes hence it possible its position to be adjusted in the horizontal direction and at least one rolling track to be adjusted in vertical position, while having a very limited length as compared to the traditional hinges which are provided with a pivot and a female portion designed to house said pivot, through which (with the length of said hinge positions being kept unchanged) the screws (14) and (15) for fastening the same hinge—as well as no one of elements (13)—cannot extend through. Besides the above mentioned adjustments, the absence of the pivot, i.e., of the traditional male-female coupling, makes it possible the hinges (1A) to be capable of operating also with axes (10) and (11) being not coincident, or being mutually incident or parallel, without that this condition may cause any increases in the friction forces associated with hinge operation and independently from the load it is submitted to.

Figure 4:
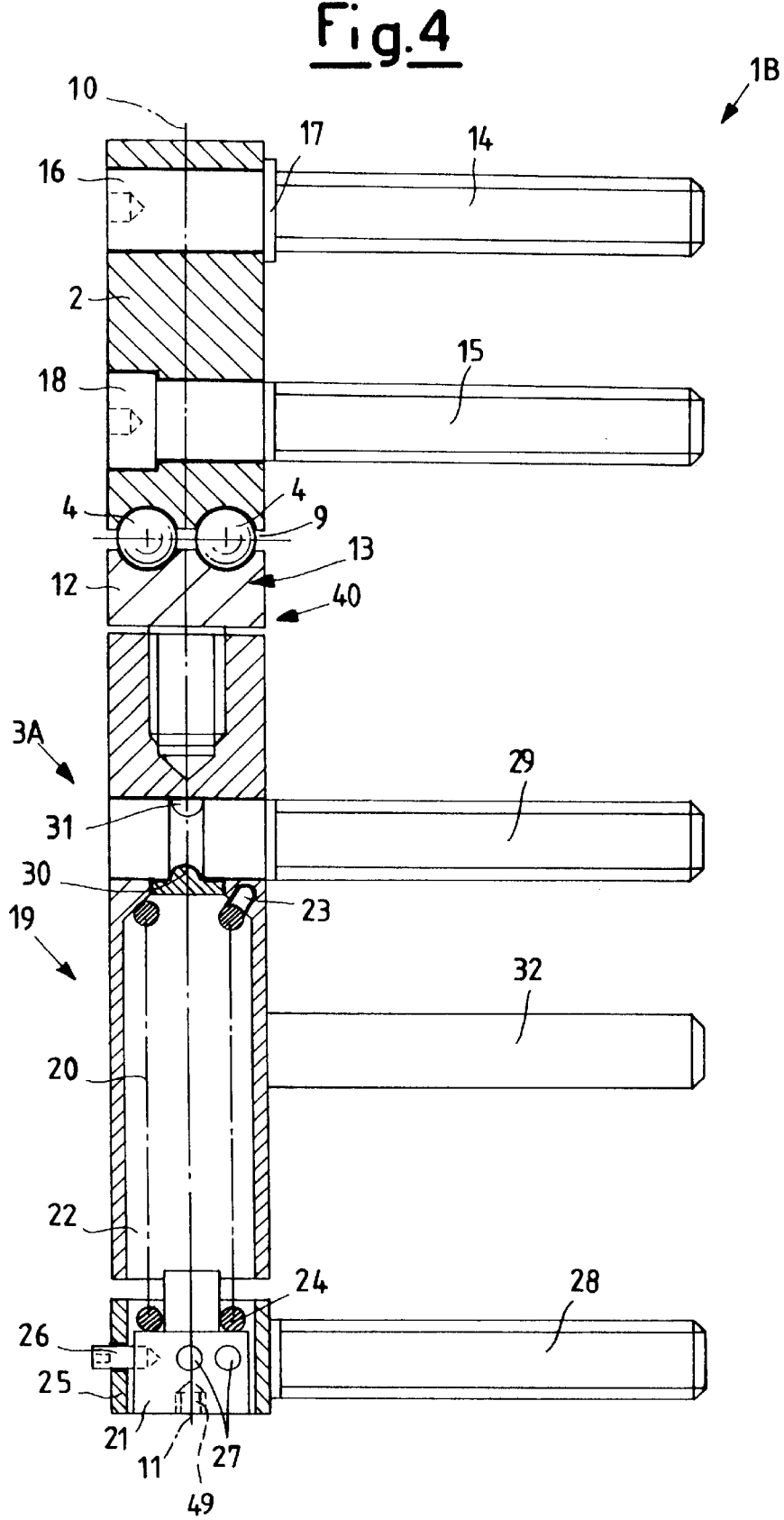
FIG. 4 illustrates a hinge of the invention according to a third embodiment.

In FIG. 4, the third embodiment of the hinge according to the present invention is generally indicated with (1B), while the corresponding elements to hinge (1A) are indicated with the same reference numerals. The hinge (1B) is different from the hinge (1A) substantially owing to the fact that it comprises (for example, in a second element, as indicated with (3A) in order to distinguish it from the preceding element), a device (19) for automatically shutting the door to which the hinge (1B) is applied.

In the herein exemplified case, the device (19) substantially comprises a spring (20) and a preloading element (21). The spring (20) is contained inside a hollow (22) and has a first end (23) thereof integral with the element (3A). The second end (24) of the spring (20) is integral (for example, due to the friction of its turns) with the preloading element (21) which is housed inside an annular element (25) physically separated from the body of the element (3A). The annular element (25) is provided with a stud (26) suitable for engaging corresponding bores (27) provided on the preloading element (21) and with a screw threaded stem (28). The preloading element (21) is provided with an actuation hollow (49) (in the herein exemplified case, with a hexagonal cross-section), by means of which the element (21) can be rotated until the desired preloading of spring (20) is reached. The element (3A) is equipped with a screw (29) and a pivot (32). The screw (29) is constrained to the second element (3A) through a relief (30), which is mutually engaged with a groove or hollow (31), which relief/groove means, by cooperating, allow the screw (29) to only rotate around itself. The pivot (32) is fixed relatively to the element (3A).

During the use, the spring (20) can be given an initial preload by acting on the element (21) which can be blocked in any desired positions by means of the stud (26). On door (33) opening (see also FIG. 5), the spring is further loaded, tightening its turns. On door (33) getting released, the spring (20) returns energy stored in it to the same door (33), causing it to shut.

Also in this embodiment, the lack of the male portion and mating female portion allowed the device (19) for automatic shutting of the door to be easily housed inside the hinge (1B) without the latter having to be given considerably large longitudinal (i.e., vertical) dimensions. Furthermore, the reliable absence of sliding frictions made it possible the device (19) (which used springs the maximal diameter of which is substantially equal to the diameter of the relevant hinges) to correctly operate also on relatively heavy-weight doors, as fireproof and/or steel-clad doors. In such a way, it is possible to avoid applying to doors provided with hinges according to the present invention, automatic door shutting devices of the external type, which, by being of hydraulic type, are more delicate and expensive.

Figure 6:
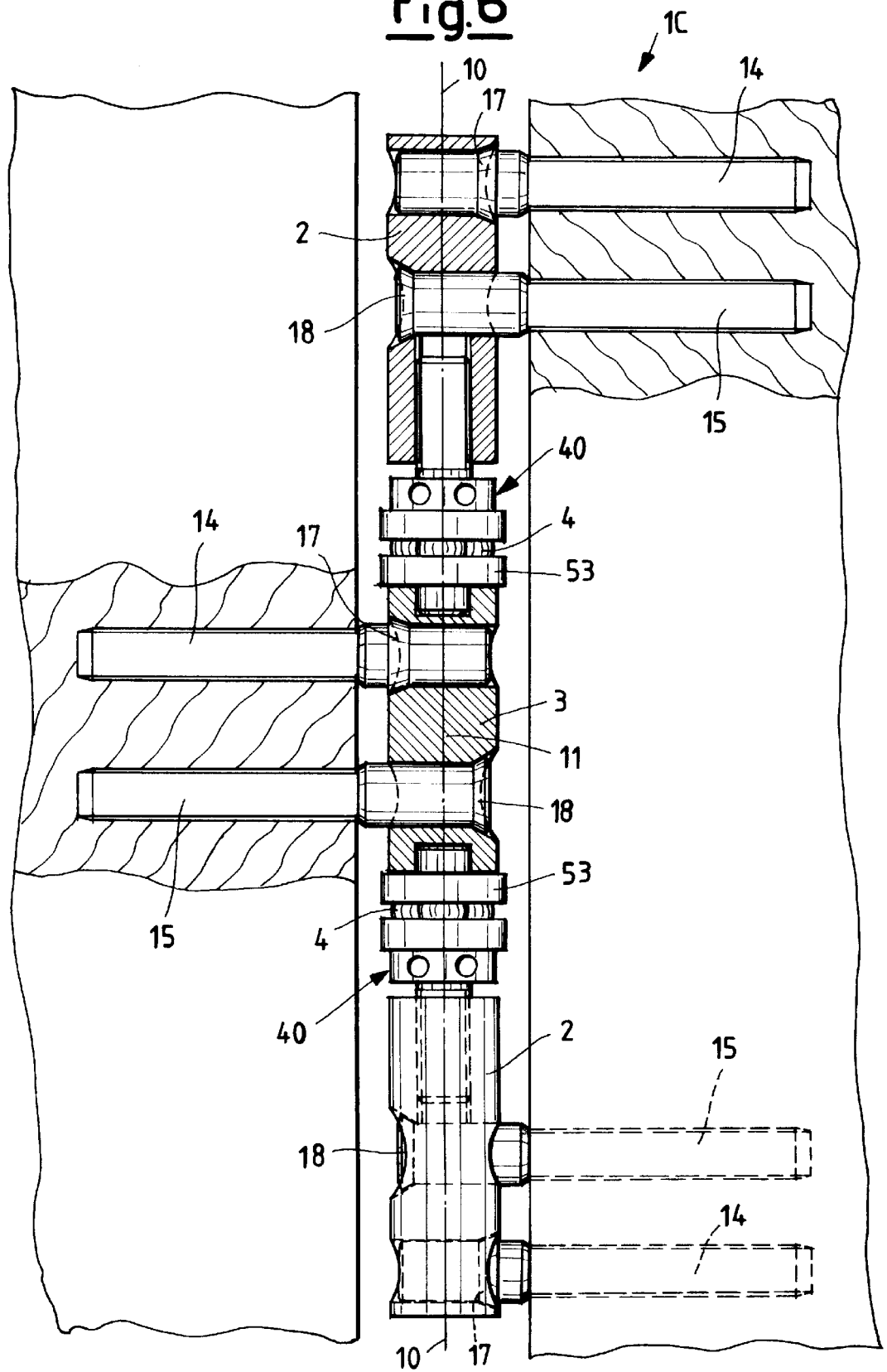
FIG. 6 illustrates a hinge of the invention according to a fourth embodiment.

In FIG. 6, the fourth embodiment of hinge according to the present invention is generally indicated with reference no. (1C) and the corresponding elements to hinge (1A) bear the same reference numerals.

Figure 5:
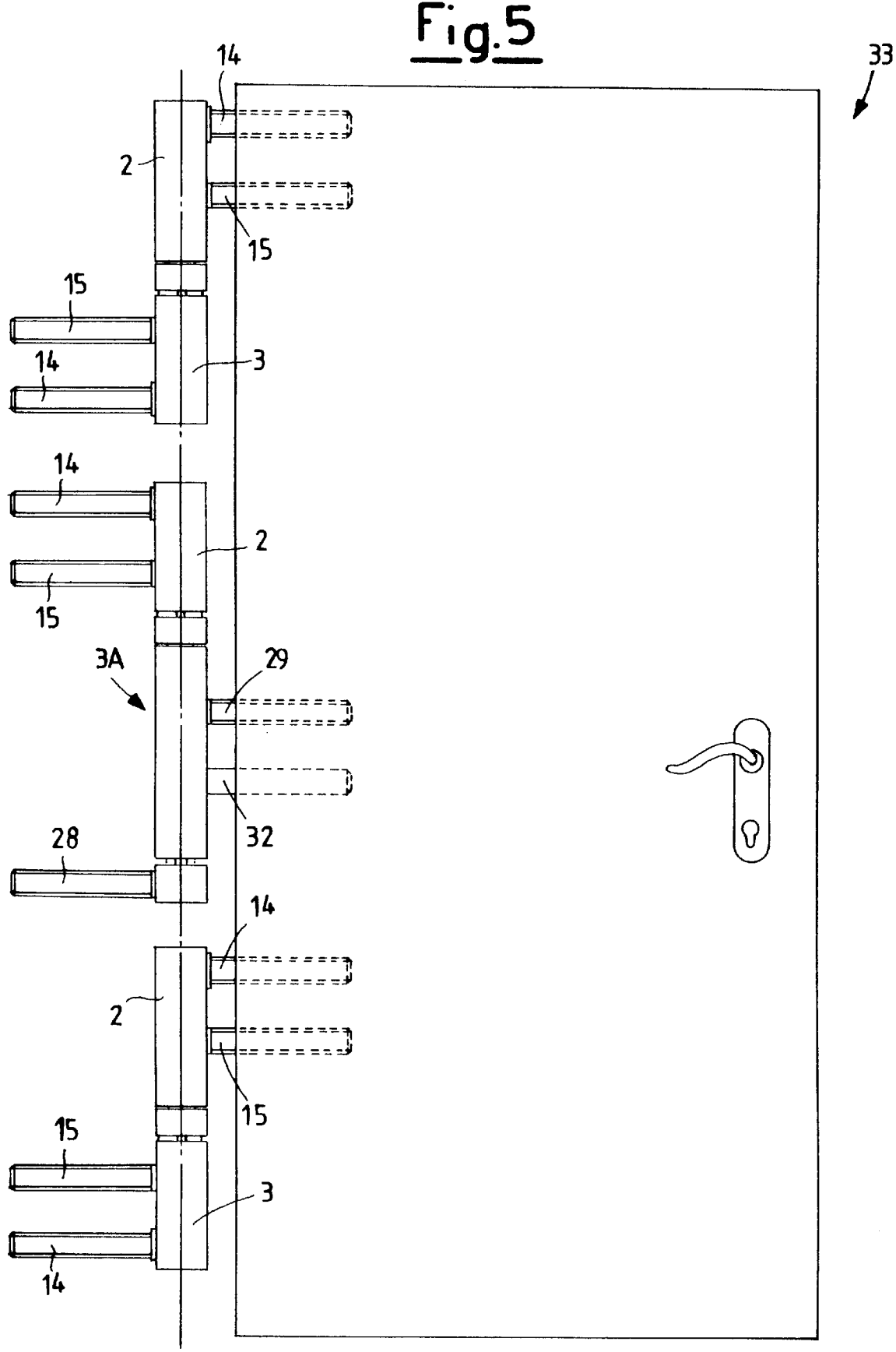
FIG. 5 illustrates an assembly (i.e., consisting of a door with its upright) provided with hinges, according to the second and third embodiments.

Hinge (1C) differs from hinge (1A) substantially because it comprises two first elements (2) which are provided with adjustment means (40) between which one single second element (3) is inserted which, however, is provided at its opposite ends, with two annular tracks (6) The advantage offered by such a configuration is that such a hinge (when installed) constrains the door in such a way that it cannot be separated from the upright by splitting the hinge, for example, by raising the same door relatively to the upright. Such a feature constitutes a very appreciated safety element which, among others, prevents the need for using at least two hinges, as illustrated in FIG. 5, in order to fasten a door to its upright. During the installation, the blockade of hinge (1C) already implies an initial fastening of the door to its upright. Such an initial fastening is obtained by acting on the screw means (13). Still acting on said screw means (13), the balls (4) can also be compressed to a larger or lesser extent by establishing (should it be necessary) a braking friction torque as a function of the needed requirements according to the door and usage type. Therefore, the hinge (1C) can be so adjusted as to also exert a braking torque of such a value as to be useful for co-operating with a possibly installed device for automatic door shutting.

In hinge (1C), the annular tracks (5) and (6) are all housed on interchangeable elements (53); in such a way, servicing said hinges results to be particularly inexpensive, because, when the unavoidable wear phenomena will so require, the hinge can be restored in its original operating conditions by simply replacing only the rolling bodies (in the herein exemplified case, balls (4)) and the relevant annular tracks (5) and (6). The operation is fast and the expense for spare parts to replace the worn parts is limited, because replacement of the entire hinge can be avoided, which, as well-known, is an operation which implies the mutual readjustment of upright-door whole.

Figure 7:
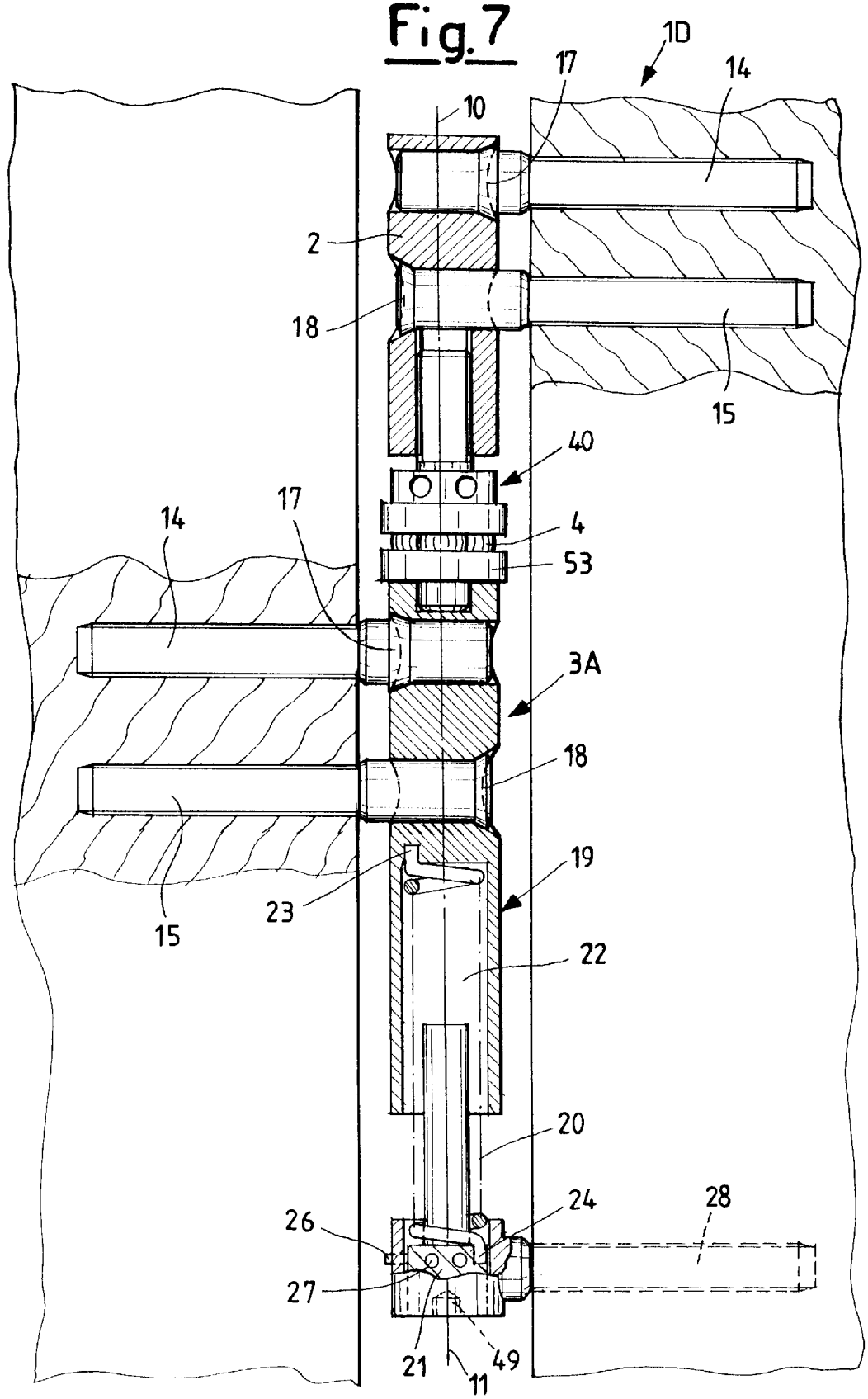
FIG. 7 illustrates a hinge of the invention according to a fifth embodiment.

In FIG. 7, the fifth embodiment of hinge according to the present invention is generally indicated with (1D), and the corresponding elements to hinge (1B) are indicated with the same reference numerals. Hinge (1D) is essentially different from hinge (1B) substantially owing to the fact that it has all its fastening screws (14) and (15) running through the hinge elements, thus combining the advantages offered by such a feature (advantages which have already been illustrated hereinabove) with the advantages resulting from the automatic door shutting device (19) commonly referred to as "door shutter".

Figure 8:
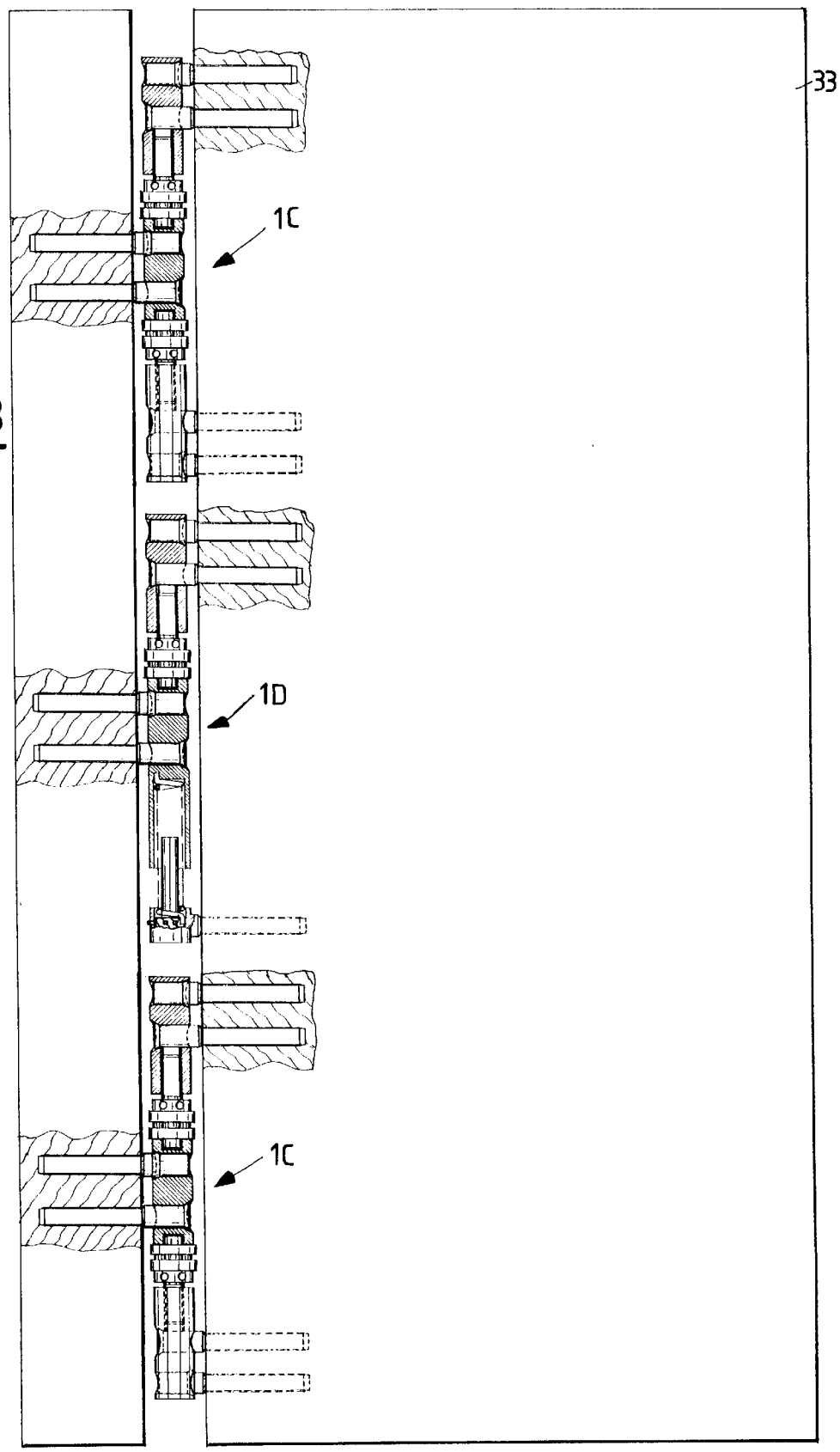
FIG. 8 illustrates an assembly (i.e., consisting of a door with its upright) provided with hinges, according to the fourth and fifth embodiments.

FIG. 8 illustrates an example of installation of hinges (1C) and (1D) according to the fourth and fifth embodiments.

Figure 9:
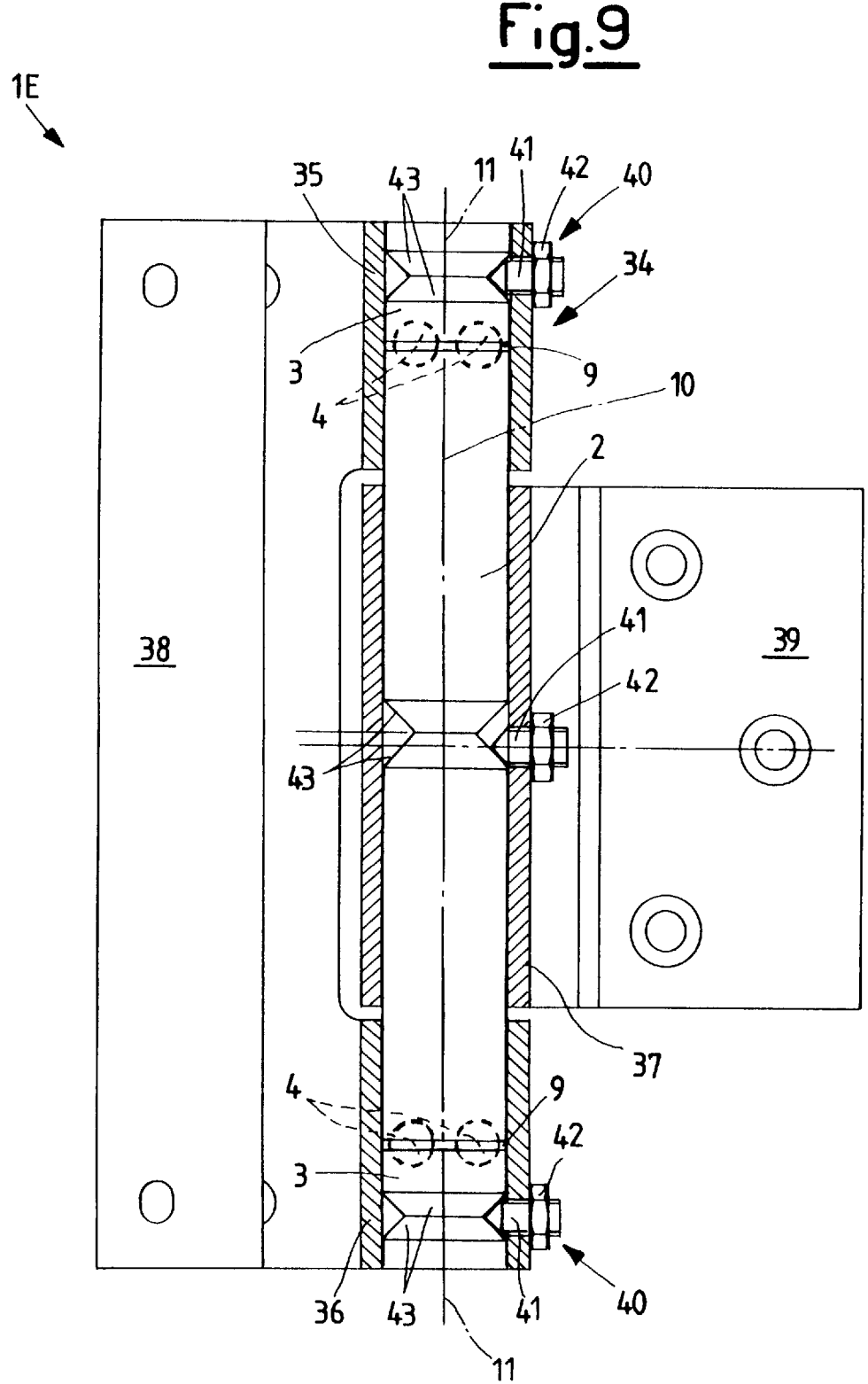
FIG. 9 illustrates a hinge of the invention according to a sixth embodiment.

In FIG. 9, the sixth embodiment of hinge according to the present invention is generally indicated with reference number (1E), and the corresponding elements to hinge (1) are indicated with the same reference numerals. Hinge (1E) essentially differs from hinge (1) substantially because it has a first element (2) and two second elements (3) which, to be fastened to the upright or to the door of said upright, are housed inside a tubular shell (34). The shell (34) consists of two end portions: i.e., a first end portion (35) and a second end portion (36); and a central portion (37). The end portions (35) and (36) are constrained to a first, "C"-shaped flange (38) and contain the second elements (3), and the central portion (37) contains the first element (2) and is constrained to a second, central flange (39). The hinge is completed by means (40) for the adjustment of the vertical position of the first (2) and second (3) elements, each of which comprises, in the herein exemplified case, a grub-screw (41) and a check nut (42). The grub-screw (41) acts on inclined planes (43) provided in the first (2) and second (3) elements.

Figure 10:
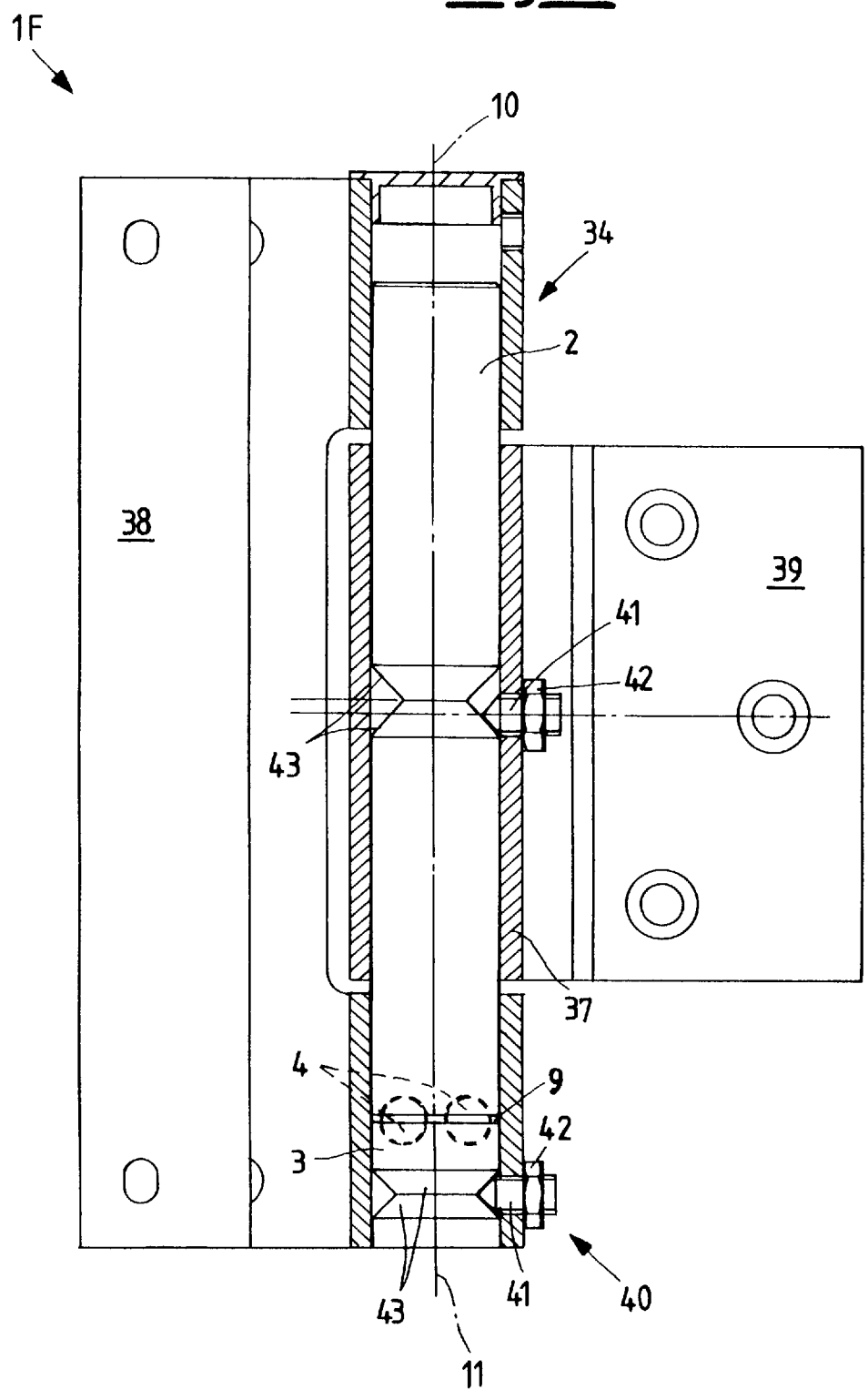
FIG. 10 illustrates a hinge of the invention according to a seventh embodiment.

In FIG. 10, the seventh embodiment of hinge according to the present invention is generally indicated with (1F), and the corresponding elements (1E) are indicated with the same reference numerals. The hinge (1F) essentially differs from hinge (1E) substantially due to the fact it constitutes a cheaper model, because it is provided with one single second element (3).

Figure 11:
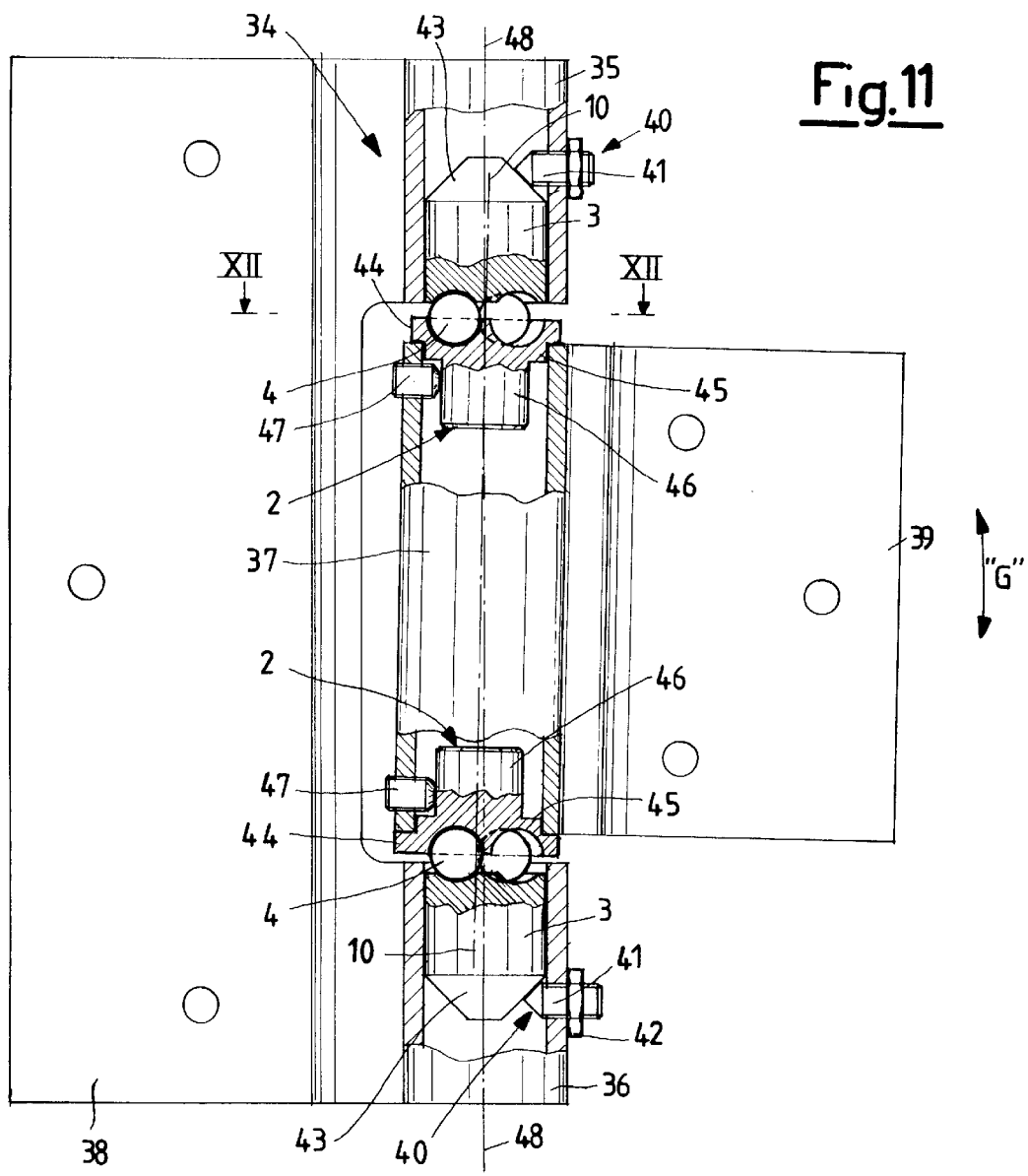
FIG. 11 illustrates a hinge of the invention according to a eighth embodiment.
Figure 12:
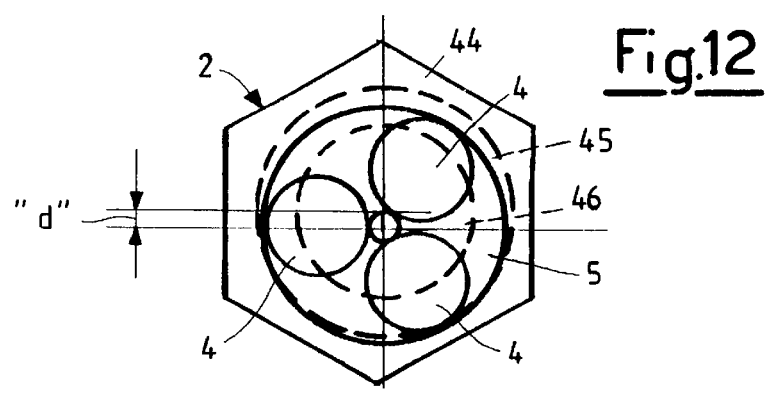
FIG. 12 shows a sectional view according to line XII—XII of FIG. 11.

In FIGS. 11 and 12, the eighth embodiment of hinge according to the present invention is generally indicated with (1G), and the corresponding elements to hinge (1E) are indicated with the same reference numerals. Hinge (1G) has two first elements (2) and two second elements (3) which are housed inside the tubular shell (34) which is formed by two end portions: i.e., a first end portion (35) and a second end portion (36); and a central portion (37). The end portions (35) and (36) are both constrained to the first "C"-shaped flange (38) and contain the second elements (3), and the central portion (37) contains, at its ends, the first elements (2), and is constrained to the second, central flange (39). The hinge is completed by the means (40) for vertical adjustment of second elements (3). Each of said adjustment means (40) comprises, in the herein exemplified case, a grub-screw (41) and a check nut (42). The grub-screw (41) acts on an inclined plane (43) provided in the second element (3).

Each first element (2) of hinge (1G) has a monolithic structure formed by a plurality of coaxial polygonal bodies (44)–(46). The body (44) has preferably a hexagonal cross-section, so that it will be possible to act by means of a spanner on the relevant first element (2) and cause it to rotate around itself, whilst the polygonal bodies (45) and (46) are cylindrical. Each first element (2) is locked inside the central portion (37) through the engagement of the side surface of the second cylindrical body (45) with the inner surface of the central portion (37) and the engagement of a second grub-screw (47) acting on a side surface of the cylindrical body (46). In such conditions, each first element (2) is coaxial with the central portion (37), and consequently with the first (35) and second (36) end portions of the tubular shell (35). The axis relative to which all said elements are coaxial is the axis of the hinge (1G), which is indicated with (48) in FIGS. 8 and 9.

According to an important feature of hinges (1G), the axis (10), of the first annular track (5) provided on at least one of the first elements (2) (in the herein exemplified case, both of said tracks) does not coincide with said axis (48), but is parallel to said axis (48), with it being spaced apart from said axis by a distance "d", whilst the axis (11) of the second annular tracks (6) coincides with the axis (48). In other terms, the technical teaching is essentially of positioning a same ball (4) in such a way that it simultaneously rolls on two annular tracks having non-coincident axes and which, in particular, are parallel. Inasmuch as the ball (4) rolls on the first annular track (5), it rolls according to the axis of this. However, the same ball (4) simultaneously rolls also on the second annular track (6) which is being revolving according to a different axis from the first annular track (5). Consequently, the same ball (4) moves as it simultaneously belonged to both tracks (5) and (6). The technical teaching is that the central portion (37) undergoes a rotation which results from the composition of the rotations relatively to axes (48) and (10) which are parallel to each other. During said rotation, the second, central flange (39) also varies its own position also according to arrow "G" of FIG. 8. By suitably positioning in the direction of revolution both elements (2) by acting by means of suitable tools on the respective bodies (44), the central portion (37) can also be given such a motion as to align the door relatively to the upright when the door is in its shut position. In this way, the shutting of doors can be adjusted which, due to any reasons, may have undergone settlement events, or installation mistakes. It is important to underline that, although it operates according to two non-coincident axes, such a hinge (1G) is always subject to particularly limited friction phenomena, because the balls (4) are always the only contact elements between the stationary portions and the moving portions. Therefore, such a further adjustment possibility was obtained thanks to the fact that the hinge according to the present invention is a pivot free hinge, it consequently being also free, of the female portion, which would not allow the motion in the direction of arrow "G", or would have allowed such a motion to take place only with sliding frictions. The function of said elements (i.e., the pivot and the female portions) was given to the rolling bodies [the balls (4) in therein exemplified cases] which therefore, when the hinge is installed, perform the many functions of:

getting rid of the friction reactions;

keying the first element (2) relatively to the second element (3);

allowing the first element (2) to revolve around a different axis from the revolution axis of the second element (3).

In FIG. 13, the ninth embodiment of hinge according to the present invention is generically indicated with (1H), and the corresponding elements to hinge (1G) are indicated with the same reference numerals. The hinge 1H essentially differs from hinge (1G) owing to the fact that the hollow of the central portion (37) is used in order to house the spring (20) of the automatic door shutting device (19).

As it will be seen, the spring is compressed between a first element (2) and a preloading element (21) provided with bores (27). The preloading element (21) comprises a seat inside which the second first element (2) is housed. The cylindrical body (46) of one of the first elements (2) performs the task of guiding a spring (20) in which the second end (24) is integral with the central portion (37), consequently to the second flange (39), while the first end (23) is integral with the preloading element (21). The preloading element (21) is integral with the first, "C"-shaped flange (38) through a pin (51) having an end slid inside a bore (27). The hinge (1H) is endowed with both the characteristics of the hinge (1G) and the characteristics given to it by the automatic door shutting device, however without that this implies an increase in both longitudinal and diametrical dimensions of the hinge (1H) as compared to the hinge (1G). Also this advantage is particularly appreciated.

All the hinges illustrated herein use, as their rolling bodies, balls (4); however, the rolling bodies could also be rollers, needles or the like.

LEGEND

1–1H) Hinge
2) First element
3) Second element; 3A) Second element with spring
4) Rolling bodies
5) First annular track
6) Second annular track
7) Bottom portion of (5) and (6)
8) Side portion of (5) and (6)
9) Annular gap
10) First element symmetry axis
11) Second element symmetry axis
12) Head
13) Screw element
14) First screw
15) Second screw
16) Head of the first screw
17) First stop element
18) Head of the second screw or second stop element
19) Automatic door shutting device
20) Spring
21) Preloading element
22) Hollow
23) First spring end
24) Second spring end
25) Annular element
26) Stud
27) Bores
28) Screw-threaded stem
29) Screw
30) Relief
31) Hollow
32) Pivot
33) Door
34) Tubular shell
35) First end portion
36) Second end portion
37) Central portion
38) First "C"-shaped flange
39) Second central flange
40) Vertical adjustment means
41) Grub-screw
42) Check nut
43) Inclined planes
44) Hexagonal polygonal body
45) Cylindrical polygonal body
46) Cylindrical polygonal body
47) Second grub-screw
48) Hinge (1E) axis
49) Actuation hollow
50) Seat
51) Pin
53) Replaceable elements

I claim:

1. A hinge, comprising:

at least one first element which is fastenable to an upright member and a second element which is fastenable to a door, a plurality of rolling bodies interposed between said at least one first element and second element, said rolling bodies rolling along a first annular track and a second annular track respectively provided on said at least one first element and said second element, each of said tracks having a bottom portion and two side portions, wherein said side portions are extended for retaining the rolling bodies inside the tracks during rolling of the rolling bodies along the annular tracks and form between the at least one first element and the second element, in proximity with the rolling bodies, an annular gap which is wide enough to prevent contact between the at least one first element and the second element, said annular gap also extending into an area located coinciding with axes of symmetry of said first and second elements and wherein adjacent ends of said first and second elements are spaced apart by the annular gap so as to not contact one another.

2. Hinge according to claim 1, wherein the annular tracks each have longitudinal axes which do not coincide with one another.

3. Hinge according to claim 1, wherein each of the annular tracks is provided on an element which is removable.

4. Hinge according to claim 1, wherein the rolling bodies comprise balls, rollers or needles.

5. Hinge according to claim 2, wherein the axes of the annular tracks are parallel to each other.

6. Hinge according to claim 2, wherein the axes of the annular tracks are incident to one another.

7. Hinge according to claim 1, which comprises a mechanism varying the vertical position of at least one of said annular tracks and which is engageable with said at least one of said tracks.

8. Hinge according to claim 7, wherein said mechanism varying the vertical position of said tracks comprises a screw element screwed down into the first element along the axis of symmetry thereof, said first element having a head within which the first annular track is housed.

9. Hinge according to claim 8, wherein said at least one first element comprises a pair of first elements between which said second element is positioned, said second element being provided on opposite sides thereof with two annular tracks.

10. Hinge according to claim 1, which comprises first and second stop members wherein each of said at least one first element and said second element is constrained between said first stop member and said second stop member, said stop members being positioned mutually opposite one another relative to the axes of symmetry of said first and second elements, wherein said stop members are located on a first screw and a second screw, respectively for fastening to said at least one first and said second element such that the position of the hinge is horizontally adjustable.

11. Hinge according to claim 10, wherein the second stop member and the first stop member have a frustoconical shape and are positioned with tapered portions thereof being mutually opposite one another relatively to the axes of the at least one first element and the second element.

12. Hinge according to claim 11, which comprises a device operatively engageable with the second element for automatically shutting door.

13. Hinge according to claim 12, wherein said device for automatically shutting the door comprises a spring, and a preloading element, said spring being housed inside a hollow and having a first end integral with the second element, a second end of the spring being integrally connected with the preloading element, said preloading element being housed inside an annular element which is physically separated from the body of said second element, the annular element being provided with a stud for engaging corresponding bores provided in the preloading element, and with a screw-threaded stem, with said second element being provided with a screw and a pivot wherein said screw is connected to the second element through a relief and a hollow, which, by cooperating, allow said screw to only rotate around itself, said pivot being fixed relatively to the second element.

14. Hinge according to claim 1, wherein said at least one first element comprises a first hinge element and said second element comprises second and third hinge elements which are housed inside a tubular shell having a first end portion, a second end portion and a central portion, wherein, said end portions are connected to a first, C-shaped flange and contain said second hinge elements, and said central portion contains the first hinge element and is connected to a second, central flange.

15. Hinge according to claim 14, which comprises a mechanism permitting vertical adjustment of said annular tracks.

16. Hinge according to claim 15, wherein said vertical adjustment mechanism comprises a grub-screw and a check nut in which said grub-screw acts on inclined planes provided in the first hinge element and in the second hinge elements.

17. Hinge according to claim 1, wherein said at least one first element comprise two first elements and said second element comprises two second elements which are housed inside a tubular shell having a first end portion, a second end portion, and a central portion, wherein said end portions are connected to a first, C-shaped flange and contain said second elements, and wherein the central portion contains, at end portions thereof, the first elements and is connected to a second, central flange, said hinge being provided with a mechanism adjusting the vertical position of said second elements.

18. Hinge according to claim 17, wherein said mechanism adjusting the vertical position of the second elements comprise a grub-screw and a check nut for said grub-screw, said grub-screw acting on an inclined plane provided in the second element.

19. Hinge according to claim 18, wherein said central portion is hollow and said hollow houses a spring of the device for automatically shutting the door, said spring being compressed between one of said first elements and a preloading element provided with a plurality of bores, said preloading element comprising a seat inside which one of the first elements is housed, with a cylindrical body of one of said first elements guiding the spring, and wherein the second end is integral with the central portion and with the second flange, while the first end is integral with the preloading element, said preloading element being integral with the first -C-shaped flange having one end thereof slidable into a bore, and a second end thereof resting against said C-shaped flange.

* * * * *